United States Patent
Rundell

(10) Patent No.: US 7,380,218 B2
(45) Date of Patent: May 27, 2008

(54) METHOD AND APPARATUS FOR MANAGING WINDOWS

(75) Inventor: David Neal Rundell, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 10/401,412

(22) Filed: Mar. 27, 2003

(65) Prior Publication Data

US 2004/0189712 A1   Sep. 30, 2004

(51) Int. Cl.
*G06F 3/048* (2006.01)

(52) U.S. Cl. .................. 715/808; 715/774; 715/794; 715/796; 715/809

(58) Field of Classification Search ................ 715/772, 715/774, 751–758, 788–796, 808, 809; 709/205, 709/206, 224
See application file for complete search history.

(56) References Cited

U.S. PATENT DOCUMENTS

| | | | | |
|---|---|---|---|---|
| 5,008,853 A | | 4/1991 | Bly et al. .................. 364/900 |
| 5,721,849 A | | 2/1998 | Amro | |
| 5,781,894 A | | 7/1998 | Petrecca et al. ............ 705/14 |
| 5,936,608 A | | 8/1999 | Springer ................... 345/147 |
| 5,940,612 A | * | 8/1999 | Brady et al. ............... 718/103 |
| 5,963,914 A | | 10/1999 | Skinner et al. .............. 705/11 |
| 5,964,839 A | * | 10/1999 | Johnson et al. ............ 709/224 |
| 6,119,098 A | | 9/2000 | Guyot et al. ................ 705/14 |
| 6,317,761 B1 | | 11/2001 | Landsman et al. ......... 707/513 |
| 6,326,985 B1 | * | 12/2001 | Tazoe et al. ................ 715/764 |
| 6,397,167 B2 | | 5/2002 | Skinner et al. ............. 702/183 |
| 6,463,468 B1 | | 10/2002 | Buch et al. ................. 709/219 |
| 6,516,421 B1 | * | 2/2003 | Peters ........................ 713/502 |
| 6,518,983 B1 | * | 2/2003 | Grohmann et al. ......... 715/781 |
| 6,614,457 B1 | | 9/2003 | Sanada et al. | |
| 6,763,379 B1 | * | 7/2004 | Shuster ...................... 709/224 |
| 2002/0055967 A1 | | 5/2002 | Coussement ............... 709/202 |
| 2002/0057285 A1 | | 5/2002 | Nicholas, III .............. 345/700 |
| 2002/0070972 A1 | | 6/2002 | Windl et al. ............... 345/777 |
| 2002/0073158 A1 | | 6/2002 | Dalal et al. ................ 709/206 |

(Continued)

FOREIGN PATENT DOCUMENTS

EP       0349458 A2      1/1990

(Continued)

OTHER PUBLICATIONS

Mikami, "Suggestion for New User Interface for displaying Received Messaeg in Muti-Window Environment—Text Chat Implementation", IBM Research Disclosure vol. 42, No. 419, Feb. 1999, article 41895, IP.com Electronic Publication Apr. 5, 2005, 3 pages.

*Primary Examiner*—Ba Huynh
(74) *Attorney, Agent, or Firm*—Duke W. Yee; Herman Rodriguez; James O. Skarsten

(57) ABSTRACT

A method, apparatus, and computer instructions for managing windows in a foreground and a background in a data processing system. A buffer is monitored for user input in response to receiving a request to present a pop-up window in a foreground. A determination is made as to whether the application in the foreground is an interruptible application. The pop-up window is presented in the foreground if user input is absent and if the identified application is an interruptible application.

18 Claims, 3 Drawing Sheets

U.S. PATENT DOCUMENTS

| | | | |
|---|---|---|---|
| 2002/0083136 A1 | 6/2002 | Whitten, II | 709/205 |
| 2002/0128803 A1 | 9/2002 | Skinner at al. | 702/188 |
| 2002/0129141 A1 | 9/2002 | Sogabe et al. | 709/224 |
| 2002/0133565 A1 | 9/2002 | Huat | 709/218 |
| 2002/0143916 A1 | 10/2002 | Mendiola et al. | 709/223 |
| 2002/0184309 A1 | 12/2002 | Danker et al. | 709/204 |
| 2003/0039630 A1* | 2/2003 | Albrecht | 424/85.7 |
| 2003/0048286 A1* | 3/2003 | Lal | 345/700 |
| 2004/0021899 A1* | 2/2004 | Jost et al. | 358/1.15 |
| 2004/0125149 A1* | 7/2004 | Lapidous | 345/808 |

FOREIGN PATENT DOCUMENTS

| | | |
|---|---|---|
| EP | 2000200129 | 7/2000 |
| JP | 2000-200129 | 7/2000 |
| KR | 249336 | 3/2000 |
| WO | WO 02-33536 A2 * | 4/2002 |

\* cited by examiner

METHOD AND APPARATUS FOR MANAGING WINDOWS

BACKGROUND OF THE INVENTION

1. Technical Field

The present invention relates to an improved data processing system, and in particular to a method, apparatus, and computer instructions for managing windows in a data processing system. Still more particularly, the present invention provides a method, apparatus, and computer instructions for managing the movement of windows between a background mode and a foreground mode.

2. Description of Related Art

Instant messaging is an online chat medium, allowing users to communicate with each other and collaborate in real-time over a network data processing system. Instant messaging is commonly used over the Internet. Instant messaging applications monitor and report the status of users that have established each other as online contacts. This information is typically presented to a user in a window. Instant messaging applications also are often used by users conducting business. By utilizing instant messaging, business users can view each other's availability and initiate a text conversation with colleagues or customers when a desired contact becomes available.

Typically, with instant messaging applications, communications between users are initiated by users selecting the name of the person with which they desire to communicate. Then, the users type messages in the dialog box and press "send". These messages appear instantly on the other selected recipient's computer.

Until now, instant messaging has been developed largely for home users, but used by home and business users alike. Instant messaging allows an organization to deploy and utilize this "need-to-have" technology in a business setting.

Although instant messaging is a useful tool, having windows pop up with messages while a user is working on other documents can be distracting and frustrating. For example, if a user is typing in a document using a word processor application and an instant message is received, a pop-up window changes the focus of the desktop. In other words, the word processing document moves from the foreground to the background, while the pop-up window moves to the foreground. If the user is typing information, this input is often redirected into the pop-up window, rather than the document. Currently, a user may set a "do not disturb" or "away" preference to avoid this type of distraction. This mechanism, however, requires user interaction to activate.

Further, such a change in focus also may occur for different pop-up windows representing different contacts in the instant messaging application. As a result, the user may type an incorrect message and send it to an unintended contact. The use of a "do not disturb" or "away" preference is ineffective because once the user begins sending a message to a contact, this status is changed and no longer prevents pop-up windows from being presented in the foreground. A change in focus also may occur with respect to other windowing applications. Thus, the change in focus may occur for any application that pushes a window to the foreground. As a result, similar problems may result from other windowing applications in addition to instant messaging applications.

Therefore, it would be advantageous to have an improved method, apparatus, and computer instructions for managing windows, such as pop-up windows, in a data processing system.

SUMMARY OF THE INVENTION

The present invention provides a method, apparatus, and computer instructions for managing windows in a foreground and a background in a data processing system. A buffer is monitored for user input in response to receiving a request to present a pop-up window in a foreground. A determination is made as to whether the application in the foreground is an interruptible application. The pop-up window is presented in the foreground if user input is absent and if the identified application is an interruptible application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
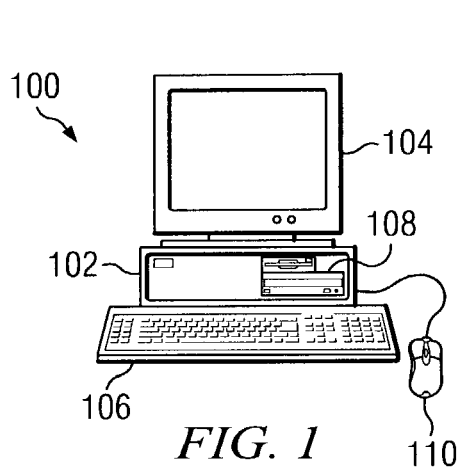
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
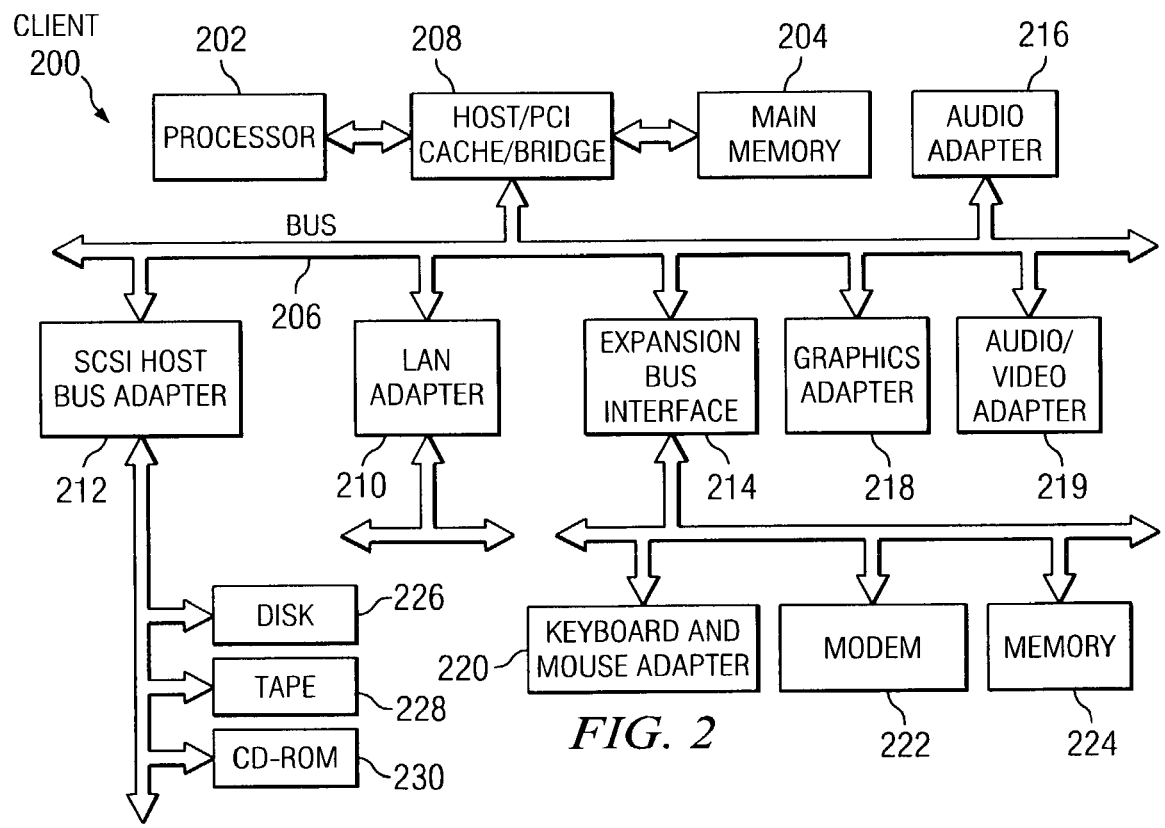
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, apparatus, and computer instructions for managing windows in a data processing system. In particular, the mechanism of the present invention monitors for user input in a buffer system, such as a keyboard buffer or an input buffer for some other device. This monitoring is initiated in response to a request to move a window from a background to a foreground or to present a window in a foreground. If a user is actively inputting information, this user input shows up as activity or input data within the buffer or buffers being monitored. If activity is not present, then the window may be moved to or presented in the foreground. If activity is present, the request to move the window to the foreground is ignored. The window may be moved to the foreground at a later point in time when activity is no longer present.

Further, the mechanism of the present invention also may check a list of applications to see whether the application in the foreground is one that can be interrupted or moved into a background mode. In these examples, the check is made if no activity or user input is present in the buffer system. If activity is not present in the buffer system and the application cannot be interrupted, the window is not moved to the foreground. The window may be moved to the foreground at a later point in time when no activity is present in the buffer system and the application in the foreground may be interrupted. These mechanisms are especially useful for applications such as instant messaging applications in which large amounts of activity may result in many windows, like pop-up windows, being moved to the foreground at different times.

In this manner, the mechanism of the present invention provides a way to avoid interruptions in focus based on requests for windows to be moved to the foreground, which may not have been selected by the user. This mechanism provides an advantage over the presently available "do not disturb" and "away" mechanisms available for instant messaging applications.

Figure 3:
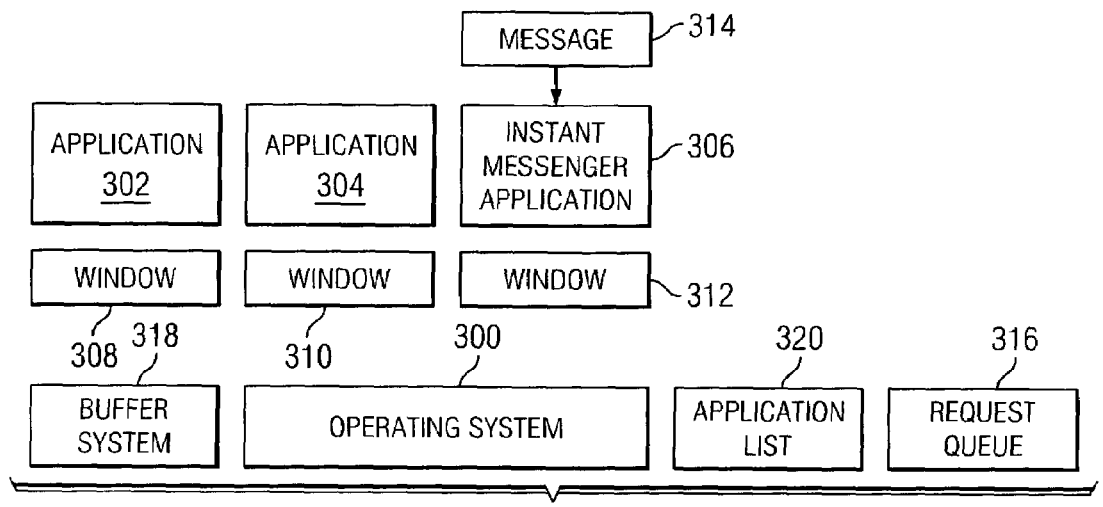
FIG. 3 is a diagram illustrating components used in managing windows in accordance with a preferred embodiment of the present invention.

With reference next to FIG. 3, a diagram illustrating components used in managing windows is depicted in accordance with a preferred embodiment of the present invention. The different components illustrated in this figure may be executing on a data processing system, such as data processing system 200 in FIG. 2.

In this example, operating system 300 controls the execution of application 302, application 304 and instant messenger application 306. In these examples, one application, such as application 302, executes in the foreground while the other applications, such as application 304 and application 306, execute in the background. An application executing the foreground is one in which a window for the application is visible and currently executing work or instructions. Such an application also is one that may be in focus. In other words, an application is in focus if it is accepting current keyboard input. An application executing in the background is an application whose window is not currently visible and is not in focus. As illustrated, window 308 is associated with application 302, window 310 is associated with application 304, and window 312 is associated with instant messenger application 306. Window 312 is a pop-up window in this example. If a message, such as message 314, is received by instant messenger application 306, a request is sent by instant messenger application 306 to operating system 300 to move window 312 to the foreground, which would result in window 308 being moved to the background. This request is placed into request queue 316 for processing by operating system 300.

In these examples, operating system 300 includes a process or mechanism for monitoring for user input activity in buffer system 318. As illustrated, buffer system 318 may include one or more buffers. These buffers may be, for example, a keyboard buffer, voice input buffer, midi keyboard buffer, or a mouse input buffer.

It no activity is detected, the mechanism of the present invention may move window 312 to the foreground. In these examples, the mechanism performs an additional check. In this check, the application associated with the window in the foreground, application 302, is identified and compared to a list of applications, such as application list 320. This list contains identification of applications that have been designated as being uninterruptible or ones that should be given priority. If application 302 is found in application list 320, then window 312 is not moved to the foreground. Instead, a check is made again at some later period of time to determine whether user input is present in buffer system 318 and as to whether the application in the foreground is present in application list 320. If neither is present, window 312 may be moved to the foreground.

In these examples, application list 320 is generated by a user. The user may set or unset application titles in list 318 for use as a filter to identify applications that should not be disturbed when running. Such a feature is useful for applications, such as those that are full-screen applications. In some cases, these type of applications may be unable to recover from a swap between the foreground and the background. Also, in these examples, the user also may select or set a timer to indicate how long they desire the buffer system to contain an absence user input or activity before allowing a window to be moved from the background to the foreground. Also, in these examples, the processes for managing windows are implemented within operating system 300. These processes for the mechanism of present invention may be located in other components, depending on the particular implementation. For example, the processes could be implemented within instant messenger application 306.

Figure 4:
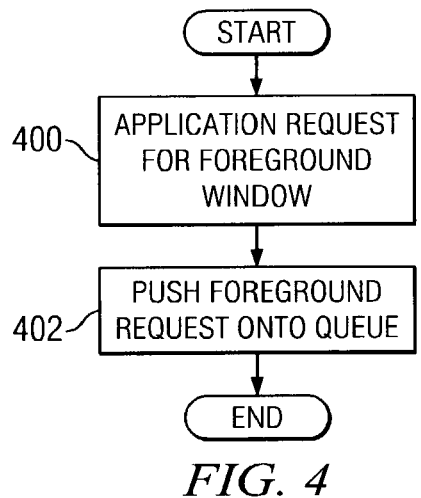
FIG. 4 is a flowchart of the process for handling a request to move a window to the foreground in accordance with a preferred embodiment of the present invention.

Turning next to FIG. 4, a flowchart of the process for handling a request to move a window to the foreground is depicted in accordance with a preferred embodiment of the present invention. The process begins by receiving an application request for a window to move to the foreground (step 400). This foreground request is pushed onto a queue, such as request queue 316 in FIG. 3 (step 402), with the process terminating thereafter.

Figure 5:
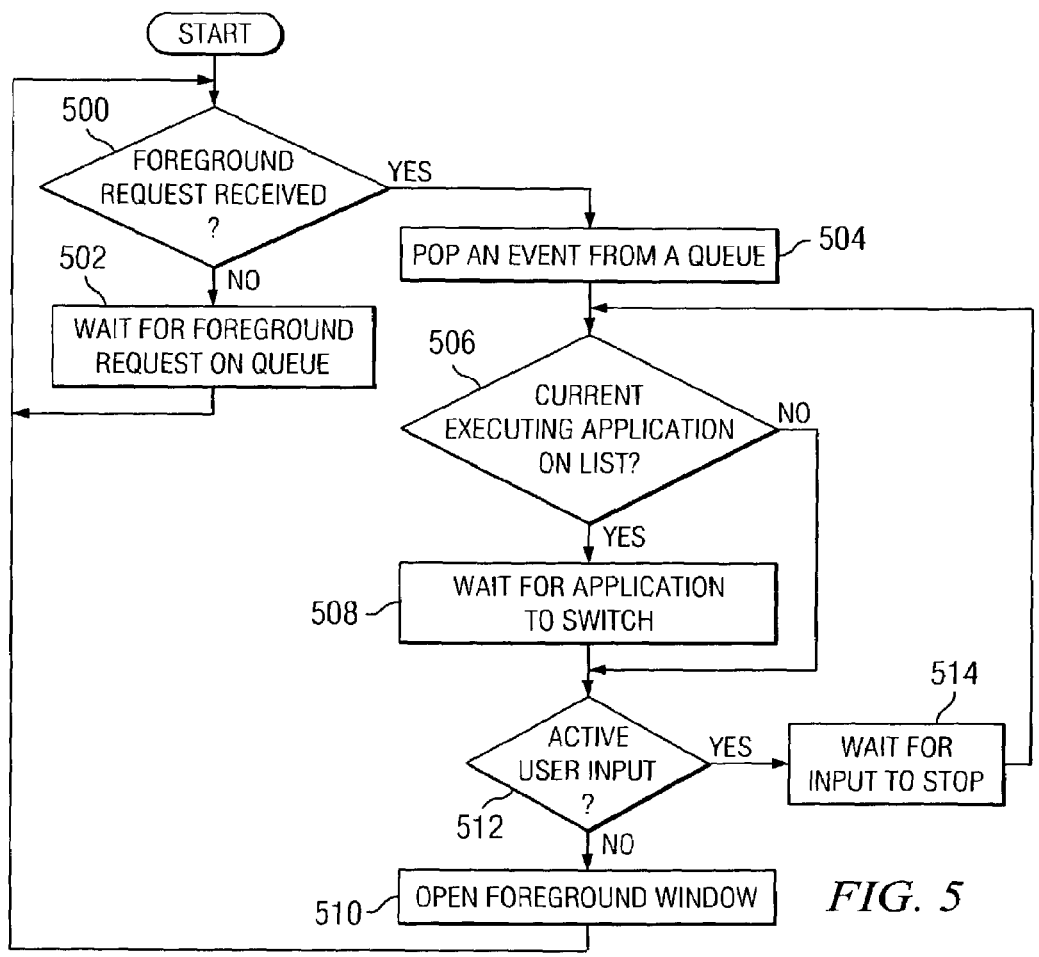
FIG. 5 is a flowchart of a process for handling windows in accordance with a preferred embodiment of the present invention.

With reference now to FIG. 5, a flowchart of a process for handling windows is depicted in accordance with a preferred embodiment of the present invention. The process illustrated in FIG. 5 may be implemented in a software component, such as operating system 300 in FIG. 3.

The process begins by determining whether a foreground request has been received (step 500). This step may be performed by checking a request queue, such as request queue 316 in FIG. 3. If a request is not present, the process waits for a foreground request on the queue (step 502) with the process then returning to step 500. When a request is detected on the queue, an event is popped from the queue (step 504). In other words, the event at the top of the queue is selected for processing.

A determination is made as to whether the currently executing application is on a list, such as application list 320 in FIG. 3 (step 506). This step may be performed by calling a process to perform an application activity check. The process illustrated in FIG. 6 as described below is a more detailed description of step 506. If the application is on the list, then the process waits for the application to switch (step 508). In the case of a triggered application, such an application may inform or indicate to the request queue when the application is no longer busy. A triggered application is an application that may receive requests, such as whether the application may be moved from the foreground to the background. In such a case, the application will indicate whether it is busy, and cannot be moved, or whether it can be moved. Thereafter, the process returns to step 506 as described above.

If the currently executing application is not on the list in step 506, a determination is then made as to whether active user input is present (step 512). User input may be detected by checking a buffer system, such as buffer system 318. As mentioned before, this buffer system may contain one or more buffers for different types of user input. In this example, the check of the buffer system is made by checking a variable set through a process, such as the one described in FIG. 7 below.

If active user input is present, the process waits for the input to stop (step 514). A user may select an activity timer that indicates how long an absence of user input must be present within a buffer system before the input is to have stopped. When the input stops, the process returns to step 506 to check the currently executing application with the application list in the manner described above.

With reference again to step 512, if no active user is present, the process opens the foreground windows (step 510), with the process then returning to step 500 as described above. This opens a new window or moves the window for the application from the background to the foreground.

Figure 6:
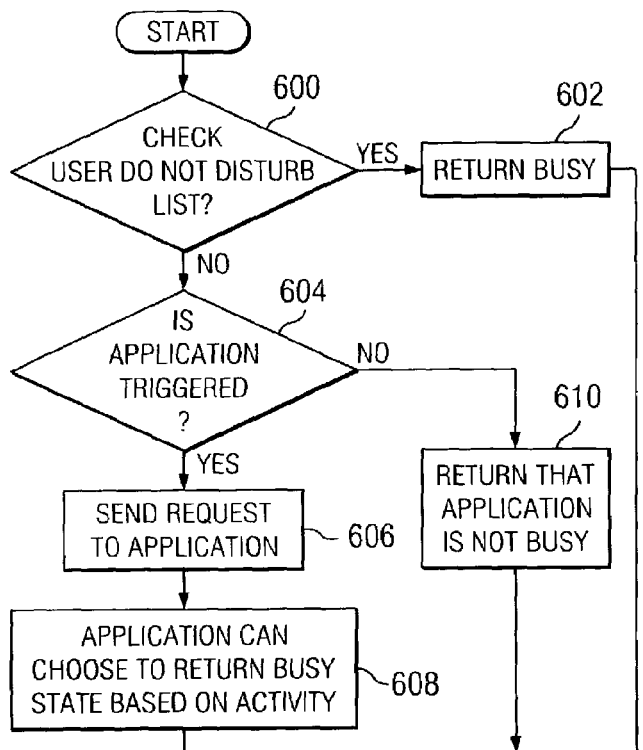
FIG. 6 is a flowchart of a process for performing an application activity check in accordance with a preferred embodiment of the present invention.

Turning now to FIG. 6, a flowchart of a process for performing an application activity check is depicted in accordance with a preferred embodiment of the present invention. The process illustrated in FIG. 6 is a more detailed description of step 506 in FIG. 5.

The process begins by checking a user "do not disturb" list to determine whether the currently executing application is on the list (step 600). This list is a list, such as application list 320 in FIG. 3. If the application is on the list, a busy indication is returned (step 602), with the process terminating thereafter.

With reference again to step 600, if the application is not on the list, a further check is performed to determine whether the application is triggered (step 604). In other words, this step tests to see if the application in the foreground is triggered to allow a request for the current activity by the application to be made. Some applications may receive questions or requests as to whether they can be moved from the foreground to the background.

If the application is triggered, then a request is sent to the application (step 606). A response is received and a busy or not busy indication is returned depending on the response (step 608), with the process terminating thereafter. With reference again to step 604, if the application is not triggered, a not busy indication is returned (step 610).

Figure 7:
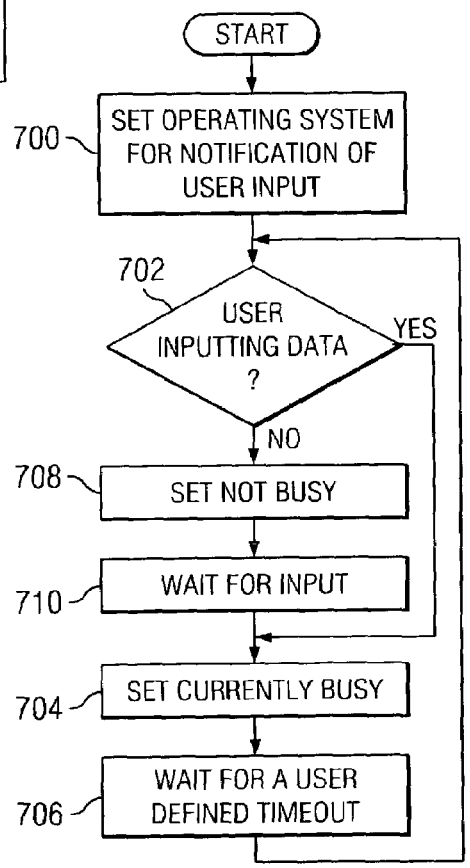
FIG. 7 is a flowchart of a process used for monitoring user input in accordance with a preferred embodiment of the present invention.

With reference now to FIG. 7, the flowchart of a process used for monitoring user input is depicted in accordance with a preferred embodiment of the present invention. The process illustrated in FIG. 7 may be implemented in a software component, such as operating system 300 in FIG. 3. In this example, the process is a background process that continuously executes to update a variable that is checked by step 512 in FIG. 5.

The process begins by setting a flag in the operating system to receive notification of user input (step 700). A determination is then made as to whether the user is inputting data (step 702). This step involves monitoring a buffer system, such as buffer system 318 in FIG. 3.

If the user is inputting data, then the variable is set to currently busy (step 704). Then, the process waits for a user defined timeout to occur (step 706). The process returns to step 702 after the timeout occurs.

Turning back to step 702, if the user is not inputting data, the process sets the variable to not busy (step 708), and then waits for a user input to be detected (step 710). The process proceeds from step 710 to step 704, after user input is detected.

Thus, the process provides an improved method, apparatus, and computer instructions for managing windows in a data processing system. This mechanism is applicable to any system in which a window may be moved from the background to the foreground or in which the window may be presented in the foreground. The mechanism monitors for user input in a buffer system, as well as checking the currently executing application to see whether this application may be interrupted or moved to the background.

In this manner, the mechanism of the present invention avoids shifting the user's focus away from a current task and avoids moving an application from the foreground to the background when such an application may be unable to recover from such a shift. This mechanism is especially useful with asynchronous pop-up windows, such as those used in instant messenger applications.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing windows, the method comprising:

responsive to receiving a request to present a pop-up window in a foreground for an application, monitoring a buffer for user input, wherein the request is sent from an instant messaging application in response to the instant messaging application receiving a message from a user, determining whether the application is an interruptible application; and presenting the pop-up window to the foreground if the user input is absent in the buffer for a period of time based on a user selected activity timer, wherein the user selected activity timer indicates how long the user input must be absent within the buffer before the user input is considered absent from the buffer, and if the application is the interruptible application, wherein the determining step comprises:

comparing the identified application with a list of uninterruptible applications wherein the list is user generated, wherein the list comprises a plurality of application titles, each application title in the plurality of application titles being capable of a setting and an unsetting, wherein the setting of a first application title acts as a filter to identify a particular application associated with the first application title that should not be disturbed when running, wherein comparing the identified application with the list comprises:

performing an application activity check, wherein performing the application activity check comprises:

checking the list to determine whether the identified application matches a corresponding application in the list; and determining if the identified application is a triggered application, if the identified application does not match the corresponding application in the list, wherein if the identified application is the triggered application a request is sent to the identified application and a response is received, wherein the response indicates one of the identified application is busy and the identified application is not busy;

identifying the identified application as the uninterruptible application if the identified application matches the corresponding application on the list; and if the identified application is identified as the uninterruptible application, comparing the identified application with the list again after a period of time.

2. A method in a data processing system for managing windows in a foreground and a background, the method comprising:

responsive to receiving a request to move a pop-up window from the background to the foreground, determining whether user input is present in a buffer, wherein the request is sent from an instant messaging application in response to the instant messaging application receiving a message from a user, ignoring the request to move the pop-up window from the background to the foreground if the user input is present in the buffer; and moving the pop-up window from the background to the foreground if user input is absent in the buffer for a period of time based on a user selected activity timer, wherein the user selected activity timer indicates how long the user input must be absent within the buffer before the user input is considered absent from the buffer, responsive to the user input being absent, identifying an application executing in the foreground to form an identified application;
determining whether the identified application is an uninterruptible applications; and
preventing moving of the pop-up window from the background to the foreground if the identified application is the uninterruptible application;
wherein determining whether the identified application is the uninterruptible applications comprises:
comparing the identified applications with a list of uninterruptible applications, wherein the list is user generated, wherein the list comprises a plurality of application titles, each application title in the plurality of application titles being capable of a setting and an unsetting, wherein the setting of a first application title acts as a filter to identify a particular application associated with the first application title that should not be disturbed when running, wherein the comparing the identified application with the list comprises:
  performing an application activity check, wherein the performing the application activity check comprises:
    checking the list to determine whether the identified application matches a corresponding application in the list; and
    determining if the identified application is a triggered application, if the identified application does not match the corresponding application in the list, wherein if the identified application is the triggered application a request is sent to the identified application and a response is received, wherein the response indicates one of the identified application is busy and the identified application is not busy;
  identifying the identified application as the uninterruptible application if the identified application matches the corresponding application on the list; and
  if the identified application is identified as the uninterruptible application, comparing the identified application with the list again after a period of time.

3. The method of claim 2, wherein the pop-up window is an asynchronous pop-up window.

4. The method of claim 2, wherein the pop-up window is for the instant messaging application.

5. The method of claim 2, wherein the buffer is at least one of a keyboard buffer and a mouse input buffer.

6. The method of claim 2, further comprising:
reinitiating the determining step after a user selected period of time if user activity is present in the buffer.

7. A method in a data processing system for managing presentation of instant messages, the method comprising:
responsive to receiving an instant message for presentation, monitoring a buffer for a presence of user input to the data processing system;
determining whether an application in a foreground window is on a list of applications; and
presenting the instant message if the user input is absent in the buffer for a period of time based on a user selected activity timer, wherein the user selected activity timer indicates how long the user input must be absent within the buffer before the user input is considered absent from the buffer, and if the application is not on the list of applications,
wherein the determining step comprises:
comparing the application in the foreground with a list of uninterruptible applications and, wherein the list is user generated, wherein the list comprises a plurality of application titles, each application title in the plurality of application titles being capable of a setting and an unsetting, wherein the setting of a first application title acts as a filter to identify a particular application associated with the first application title that should not be disturbed when running, wherein comparing the application in the foreground with the list comprises:
performing an application activity check, wherein performing the application activity check comprises:
  checking the list to determine whether the application in the foreground matches a corresponding application in the list; and
  determining if the application in the foreground is a triggered application, if the application in the foreground does not match the corresponding application in the list, wherein if the application in the foreground is the triggered application a request is sent to the application in the foreground and a response is received, wherein the response indicates one of the application in the foreground is busy and the application in the foreground is not busy;
identifying the application in the foreground as an uninterruptible application if the application in the foreground matches the corresponding application on the list; and
if the application in the foreground is identified as the uninterruptible application, comparing the application in the foreground with the list again after a period of time.

8. The method of claim 7, wherein the instant message is presented in a pop-up window.

9. The method of claim 7, wherein applications in the list of applications are selected by user input.

10. A data processing system for managing windows in a foreground and a background, the data processing system comprising:
monitoring means, responsive to receiving a request to move a pop-up window from the background to the foreground, for determining whether user input is present in a buffer, wherein the request is sent from an instant messaging application in response to the instant messaging application receiving a message from a user;
ignoring means for ignoring the request to move the pop-up window from the background to the foreground if the user input is present in the buffer;
moving means for moving the pop-up window from the background to the foreground if user input is absent in the buffer for a period of time based on a user selected activity timer, wherein the user selected activity timer indicates how long the user input must be absent within the buffer before the user input is considered absent from the buffer,
identifying means, responsive to the user input being absent, for identifying an application executing in the foreground to form an identified application;
determining means for determining whether the identified application is an uninterruptible application; and
preventing means for preventing moving of the pop-up window from the background to the foreground if the identified application is the uninterruptible application,
wherein the determining means comprises:
comparing means for comparing the identified application with a list of uninterruptible applications, wherein the list is user generated, wherein the list comprises a plurality of application titles, each application title in the plurality of application titles being capable of a setting and an unsetting, wherein the setting of a first application title acts as a filter to identify a particular application associated with the first application title that should not be disturbed when running, wherein the comparing means for comparing the identified application with the list comprises:

performing means for performing an application activity check, wherein the performing the application activity comprises:

checking means for checking the a user defined list to determine whether the identified application matches a corresponding application in the list; and determining means for determining if the identified application is a triggered application, if the identified application does not match the corresponding application in the list, wherein if the identified application is the triggered application a request is sent to the identified application and a response is received, wherein the response indicates one of the identified application is busy and the identified application is not busy;

identifying means for identifying the identified application as the uninterruptible application if the identified application matches the corresponding application on the list; and if the identified application is identified as the uninterruptible application, comparing means for comparing the identified application with the list again after a period of time.

11. The data processing system of claim 10, wherein the pop-up window is an asynchronous pop-up window.

12. The data processing system of claim 10, wherein the buffer is at least one of a keyboard buffer and a mouse input buffer.

13. A computer program product in a recordable type computer readable medium for managing windows in a foreground and a background, the computer program product comprising:

first instructions, responsive to receiving a request to move a pop-up window from the background to the foreground, for determining whether user input is present in a buffer, wherein the request is sent from an instant messaging application in response to the instant messaging application receiving a message from a user;

second instructions for ignoring the request to move the pop-up window from the background to the foreground if the user input is present in the buffer; and third instructions for moving the pop-up window from the background to the foreground if user input is absent in the buffer for a period of time based on a user selected activity timer, wherein the user selected activity timer indicates how long the user input must be absent within the buffer before the user input is considered absent from the buffer, wherein the first instructions for determining comprise:

instructions for comparing the identified application with a list of uninterruptible applications, wherein the list is user generated, wherein the list comprises a plurality of application titles, each application title in the plurality of application titles being capable of a setting and an unsetting, wherein the selling of a first application title acts as a filter to identify a particular application associated with the first application title that should not be disturbed when running, wherein instructions for comparing the identified application with the list comprise:

instructions for performing an application activity check, wherein the instructions for performing the application activity check comprise:

instructions for checking the list to determine whether the identified application matches a corresponding application in the list; and instructions for determining if the identified application is a triggered application, if the identified application does not match the corresponding application in the list, wherein if the identified application is the triggered application a request is sent to the identified application and a response is received, wherein the response indicates one of the identified application is busy and the identified application is not busy;

instructions for identifying the identified application as the uninterruptible application if the identified application matches the corresponding application on the list; and instructions for, if the identified application is identified as the uninterruptible application, comparing the identified application with the list again after a period of time.

14. A computer program product in a recordable type computer readable medium for managing windows, the computer program product comprising:

first instruction, responsive to receiving a request to present a pop-up window for an application in a foreground, for monitoring a buffer for user input, wherein the request is sent from an instant messaging application in response to the instant messaging application receiving a message from a user;

second instruction for determining whether the application is an interruptible application; and third instructions for presenting the pop-up window in the foreground if user input is absent in the buffer for a period of time based on a user selected activity timer, wherein the user selected activity timer indicates how long the user input must be absent within the buffer before the user input is considered absent from the buffer, and if the application is the interruptible application, instructions for, responsive to the user input being absent, identifying an application executing in the foreground to form an identified application;

instructions for determining whether the identified application is an uninterruptible application including instructions for comparing the identified application with a list of uninterruptible applications, wherein the list is user generated, wherein the list comprises a plurality of application titles, each application title in the plurality of application titles being capable of a setting and an unsetting, wherein the setting of a first application title acts as a filter to identify a particular application associated with the first application title that should not be disturbed when running, wherein the instructions for comparing the identified application with the list comprise:

instructions for performing an application activity check, wherein the instructions for performing the application activity comprise:

instructions for checking the user defined list to determine whether the identified application matches a corresponding application in the list; and instructions for determining if the identified application is a triggered application, if the identified application does not match the corresponding application in the list, wherein if the identified application is the triggered application a request is sent to the identified application and a response is received, wherein the response indicates one of the identified application is busy and the identified application is not busy;

instructions for identifying the identified application as the uninterruptible application if the identified application matches the corresponding application on the list; and instructions for, if the identified application is identified as the uninterruptible application, comparing the identified application with the list again after a period of time.

15. A computer program product in a recordable type computer readable medium for managing presentation of instant messages, the computer program product comprising:

first instructions, responsive to receiving an instant message for presentation, for monitoring for a presence of user input to a data processing system;

second instructions for determining whether an application in a foreground window is on a list of applications; and third instructions for presenting the instant message if the user input is absent in a buffer for a period of time based on a user selected activity timer, wherein the user selected activity timer indicates how long the user input must be absent within the buffer before the user input is considered absent from the buffer, and if the application is not on the list of applications, wherein the second instructions for determining comprise:

instructions for comparing the application in the foreground with a list of uninterruptible applications, wherein the list is user generated, wherein the list comprises a plurality of application titles, each application title in the plurality of application titles being capable of a setting and an unsetting, wherein the setting of a first application title acts as a filter to identify a particular application associated with the first application title that should not be disturbed when running, wherein the instructions for comparing the application in the foreground with the list comprise:

instructions for performing an application activity check, wherein the instructions for performing the application activity check comprises:

instructions for checking the list to determine whether the application in the foreground matches a corresponding application in the list; and instructions for determining if the application in the foreground is a triggered application, if the application in the foreground does not match the corresponding application in the list, wherein if the application in the foreground is the triggered application a request is sent to the application in the foreground and a response is received, wherein the response indicates one of the application in the foreground is busy and the application in the foreground is not busy;

instructions for identifying the application in the foreground as the uninterruptible application if the application in the foreground matches the corresponding application on the list; and instructions for, if the application in the foreground is identified as the uninterruptible application; comparing the application in the foreground with the list again after a period of time.

16. A data processing system for managing windows in a foreground and a background, the data processing system comprising:

a bus system;

a memory connected to the bus system, wherein the memory includes a set of instructions;

a processing unit connected to the bus system, wherein the processing unit executes instructions to determine whether user input is present in a buffer in response to receiving a request to move a pop-up window from the background to the foreground;

instructions to ignore the request to move the pop-up window from the background to the foreground if the user input is present in the buffer;

instructions to identify an application executing in the foreground to form an identified application, if the user input is absent;

instructions to determine whether the identified application is an uninterruptible application, wherein the instructions to determine whether the identified application is the uninterruptible application comprise:

instructions to compare the identified application with a list of uninterruptible applications, wherein the list is user generated, wherein the list comprises a plurality of application titles, each application title in the plurality of application titles being capable of a setting and an unsetting, wherein the setting of a first application title acts as a filter to identify a particular application associated with the first application title that should not be disturbed when running, wherein the instructions to compare the identified application with the list comprise:

instructions to perform an application activity check, wherein the instructions to perform the application activity check comprise:

instructions to check the list to determine whether the identified application matches a corresponding application in the list; and instructions to determine if the identified application is a triggered application, if the identified application does not match the corresponding application in the list, wherein if the identified application is the triggered application a request is sent to the identified application and a response is received, wherein the response indicates one of the identified application is busy and the identified application is not busy;

instructions to identify the identified application as the uninterruptible application if the identified application matches the corresponding application on the list;

if the identified application is identified as the uninterruptible application, instructions to compare the identified application with the list again after a period of time;

instructions to prevent moving of the pop-up window from the background to the foreground if the identified application is the uninterruptible application; and instructions to move the pop-up window from the background to the foreground if user input is absent in the buffer for a second period of time based on a user selected activity timer, wherein the user selected activity timer indicates how long the user input must be absent within the buffer before the user input is considered absent from the buffer.

17. A data processing system for managing windows, the data processing system comprising:

monitoring means, responsive to receiving a request to present a pop-up window for an application in a foreground, for monitoring a buffer for user input;

determining means for determining whether the application is an interruptible application, wherein the determining means for determining whether the identified application is the uninterruptible application comprise:

comparing means for comparing the identified application with a list of uninterruptible applications, wherein the list is user generated, wherein the list comprises a plurality of application titles, each application title in the plurality of application titles being capable of a setting and an unsetting, wherein the setting of a first application title acts as a filter to identify a particular application associated with the first application title that should not be disturbed when running, wherein the comparing means for comparing the identified application with the list comprise:

performing means for performing an application activity check, wherein the performing means for performing an application activity check comprise:

checking means for checking the list to determine whether the identified application matches a corresponding application in the list; and determining means for determining if the identified application is a triggered application, if the identified application does not match the corresponding application in the list, wherein if the identified application is the triggered application a request is sent to the identified application and a response is received, wherein the response indicates one of the identified application is busy and the identified application is not busy;

identifying means for identifying the identified application as the uninterruptible application if the identified application matches the corresponding application on the list;

if the identified application is identified as the uninterruptible application, comparing means for comparing the identified application with the list again after a period of time;

preventing means for preventing moving of the pop-up window from the background to the foreground if the identified application is the uninterruptible application; and presenting means for presenting the pop-up window in the foreground if the user input is absent in the buffer for a second period of time based on a user selected activity timer, wherein the user selected activity timer indicates how long the user input must be absent within the buffer before the user input is considered absent from the buffer, and if the application is an interruptible application.

18. A data processing system for managing presentation of instant messages, the data processing system comprising:

monitoring means, responsive to receiving an instant message for presentation, for monitoring for a presence of user input to the data processing system;

determining means for determining whether an application in a foreground window is on a list of applications, wherein the list is user generated, wherein the list comprises a plurality of application titles, each application title in the plurality of application titles being capable of a setting and an unsetting, wherein the setting of a first application title acts as a filter to identify a particular application associated with the first application title that should not be disturbed when running, wherein the determining means for determining whether the application in the foreground window is on the list comprise:

comparing means for comparing the application with the list, wherein the comparing means for comparing the identified application with the list comprise:

performing means for performing an application activity check, wherein the performing means for performing an application activity check comprise:

checking means for checking a the list to determine whether the application in the foreground matches a corresponding application in the list; and determining means for determining if the application in the foreground is a triggered application, if the identified application does not match the corresponding application in the list, wherein if the application in the foreground is the triggered application a request is sent to the application in the foreground and a response is received, wherein the response indicates one of the application in the foreground is busy and the application in the foreground is not busy;

identifying means for identifying the application in the foreground as an uninterruptible application if the application in the foreground matches the corresponding application on the list;

if the application in the foreground is identified as the uninterruptible application, comparing means for comparing the application in the foreground with the list again after a period of time; and presenting means for presenting the instant message if the user input is absent in the buffer for a period of time based on a user selected activity timer, wherein the user selected activity timer indicates how long the user input must be absent within the buffer before the user input is considered absent from the buffer, and if the application in the foreground is not on the list.

* * * * *